Nov. 6, 1928. 1,690,779
F. FREY
METHOD OF MAKING SAUSAGE CASINGS
Filed Jan. 22, 1927
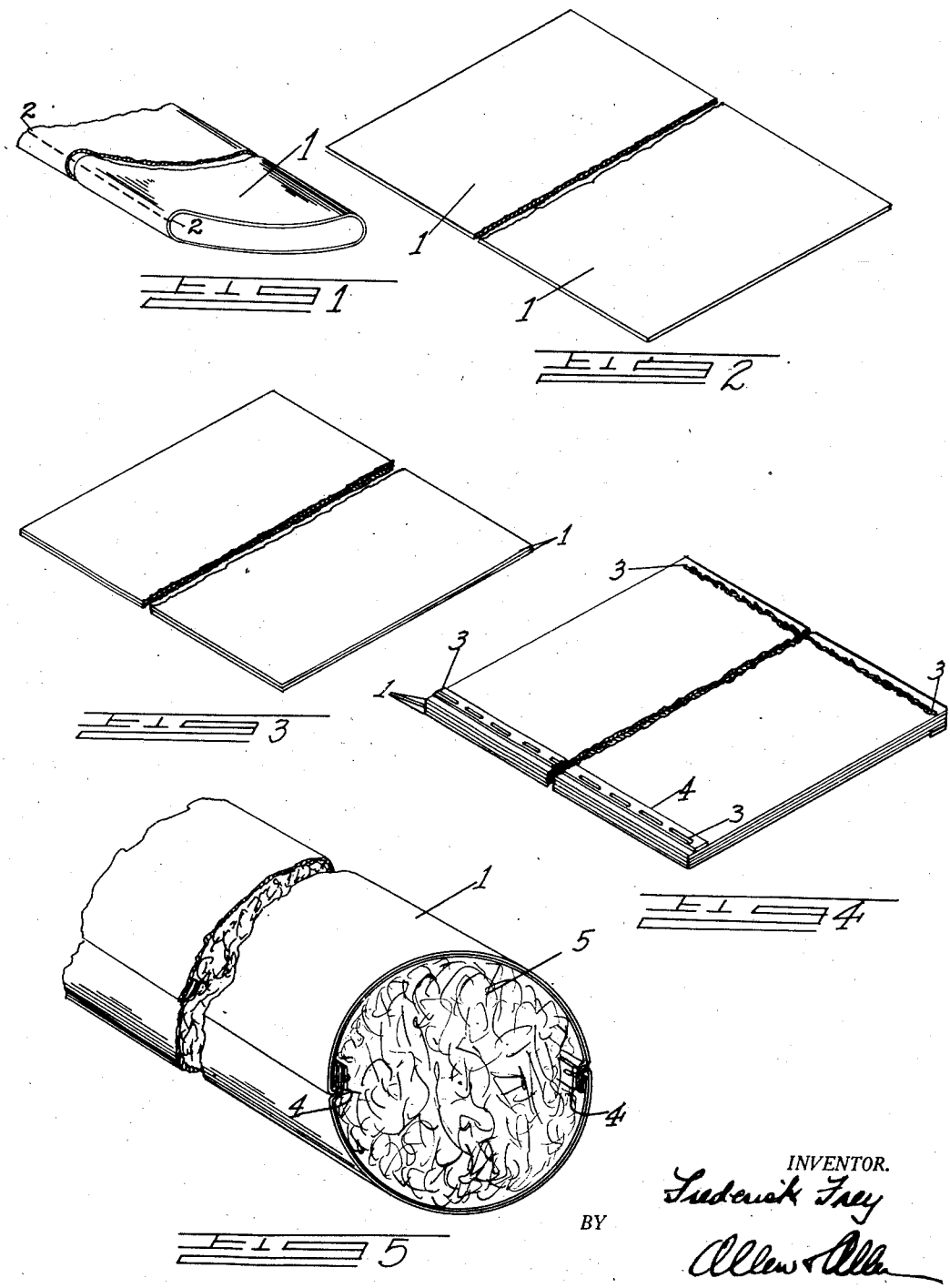
INVENTOR.
Frederick Frey
BY
Allen & Allen
ATTORNEY.

Patented Nov. 6, 1928.

1,690,779

UNITED STATES PATENT OFFICE.

FREDERICK FREY, OF CINCINNATI, OHIO.

METHOD OF MAKING SAUSAGE CASINGS.

Application filed January 22, 1927. Serial No. 162,902.

My invention relates to processes of making sausage casings or casing for meat products such as liver wurst or the like.

It is the object of my invention to provide a process for making casings from material which has heretofore been practically unavailable for use in large sausage casings. It is further my object to provide a process which will result in a stronger casing than has been heretofore made from the material from which casings have been made. A further object is the provision of casings which will have sufficient strength to permit the meat material packed therein to be cooked subsequently to the filling of the casing.

As is well known in the art, it is customary to prepare casings for sausage and other meat products from the entrails of animals, such as cattle, sheep and hogs. For certain classes of sausage meat a very tough casing is required, as the sausage may be of several feet in length, and the meat mixture may have to be cooked after the filling of the casing. For large sausages it has been customary to utilize what are called in the packer's art the hog bungs for large sausage casings. It has further been common practice for a number of years to slit the hog bungs and stitch them together to form casings which have double the size of unslit casings.

Heretofore, when tough casings have been required, the hog bung extensions composing the greater part of the hog's entrails have been unavailable because this material is thin and readily tears under the strain either of the weight of material enclosed or the strain due to cooking the meat products after the filling.

It is the object of my invention to provide a process which will render these hog bung extensions available for use in any type of casing required, regardless of the weight or length of the sausages to be filled therein. I further provide an improved process of strengthening the joint of two or more pieces of casing material which may be secured together to provide a casing of enlarged diameter.

Referring to the drawings in which I have illustrated more or less diagrammatically portions of material illustrating my invention:

Figure 1 is a perspective view of an unslit hog bung extension.

Figure 2 is a perspective view of a slit bung extension.

Figure 3 is a perspective view of several extensions laid one on another.

Figure 4 is a perspective view of a casing stitched together in accordance with my process.

Figure 5 is a perspective view of a filled sausage casing.

The hog bung extension indicated at 1 in Figure 1 is ordinarily thoroughly cleansed and pickled at the packing house and after again washing and partially drying the extensions, the casing manufacturer slits the extension along a straight line such as is indicated at 2—2. Several layers of slitted extensions which ordinarily will be at least several feet in length are then laid one on another. Figure 2 is a perspective view of one slitted extension, and it should be noted that the thickness of the piece shown is much exaggerated in order to make illustration possible. Figure 3 illustrates two slitted pieces laid one on the other as is required to form a casing wall of sufficient strength to permit the manufacture of serviceable casings. Figure 4 shows four ply of pieces stitched together with stitching such as is indicated at 3—3, and with a strip of cloth tape 4, applied to the casing prior to the insertion of the stitches, and also preferably from the side of the casing through which the sewing needle is first inserted. A chain or lock stitch such as is indicated at the right border of the piece shown in Figure 4 is preferable. After the casing has been stitched together it is turned inside out as indicated in Figure 5, and the casing may then be filled with meat products as indicated at 5.

While I have shown a strip of cloth tape, a strip of tough animal matter may be used and the threads reinforced thereby. It will also be within the scope of my process to use a larger portion of thin cloth and I may apply the reinforcing cloth between the casing layers. The entire casing may be lined with a thin cheesecloth and stitching may be applied down more than one line of reinforcement. It will further be entirely practical to stitch together short pieces at their ends to make long pieces, although such a step does not offer much commercial advantage, as the pieces of the extensions are usually more than long enough for the purposes required.

The process consists in laying a plurality of layers of extension material one on another, and thus stitching together with tape or cloth reinforcement for the stitches, a casing which shall be made up of walls which will be strong enough to retain the weight required. My invention is of considerable commercial importance, because it enables me to utilize for tough casing material such as is adapted for use for retaining liver wurst and other sausages of large diameter, material which has heretofore been practically a waste product.

Having thus described my invention what I claim as new and desire to secure by Letters Patent is:—

1. The process of making sausage casings which consists in taking a double ply layer of hog bung extension material for each of the walls of a casing, and stitching the double ply layers together adjacent their edges, and reinforcing the stitches with a strip extending in alignment with the line of stitches.

2. The process of making sausage casings which consists in taking a double ply layer of hog bung extension material for each of the walls of a casing, and stitching the layers together at their edges, and reinforcing the outer walls at the time of stitching with cloth material.

3. The process of making sausage casings which consists in slitting hog bung extensions, and stitching the slit sections together with a strip of tape reinforcing the line of stitches.

4. That process of making sausage casings which consists in slitting hog bung extensions, stitching at least four ply of said extensions together at their edges with cloth reinforcing the lines of stitches.

FREDERICK FREY.